United States Patent [19]

Lane et al.

[11] Patent Number: 5,580,373

[45] Date of Patent: Dec. 3, 1996

[54] AQUEOUS INK COMPOSITIONS CONTAINING AMIDE ANTI-CURL AGENT

[75] Inventors: Gregg A. Lane, San Diego; Keshava A. Prasad, San Marcos, both of Calif.

[73] Assignee: E. I. Du Pont de Nemours and Company, Wilmington, Del.

[21] Appl. No.: 574,473

[22] Filed: Dec. 19, 1995

[51] Int. Cl.⁶ .................................................. C09D 11/02
[52] U.S. Cl. ...................................... 106/20 R; 106/22 H
[58] Field of Search ............................... 106/20 R, 22 H, 106/23 H

[56] References Cited

U.S. PATENT DOCUMENTS

| | | | |
|---|---|---|---|
| 4,365,998 | 12/1982 | Sugiyama et al. | 106/22 H |
| 4,672,875 | 12/1986 | Kobayashi et al. | 106/22 H |
| 5,131,949 | 7/1992 | Tochihara et al. | 106/22 H |
| 5,160,372 | 11/1992 | Matrick | 106/19 R |
| 5,173,112 | 12/1992 | Matrick et al. | 106/20 |
| 5,205,861 | 4/1993 | Matrick | 106/22 H |
| 5,223,026 | 6/1993 | Schwarz, Jr. | 106/22 H |
| 5,224,987 | 7/1993 | Matrick | 106/20 R |
| 5,302,197 | 4/1994 | Wickramanayke et al. | 106/22 H |
| 5,356,464 | 10/1994 | Hickman et al. | 106/20 R |
| 5,421,871 | 6/1995 | Onishi et al. | 106/22 H |
| 5,478,383 | 12/1995 | Nagashima et al. | 106/22 H |

*Primary Examiner*—Helene Klemanski

[57] ABSTRACT

Aqueous ink compositions containing anti-curl agents substantially reduce or eliminate paper curl in plain-paper printed elements without adversely effecting storage stability, decap properties or print quality, and thus eliminate the need for expensive and bulky mechanical curl-arresting devices or special curl-resistant substrates. Printing the inks on plain-paper substrates is the sole step in a process for reducing paper curl in plain-paper printed elements.

34 Claims, No Drawings

AQUEOUS INK COMPOSITIONS CONTAINING AMIDE ANTI-CURL AGENT

FIELD OF THE INVENTION

This invention relates to aqueous inks, and more particularly to aqueous ink jet ink compositions which eliminate curl in printed plain-paper elements.

BACKGROUND OF THE INVENTION

Ink jet printing is a non-impact method that produces droplets of ink that are deposited on a substrate, such as paper or transparent film, in response to an electronic digital signal. Thermal or bubble jet drop-on-demand ink jet printers have found broad application as output for personal computers in the office and the home.

Aqueous inks used in ink jet printing have water as a major component. Water has the advantage of being non-toxic, non-combustible and environmentally sound relative to non-aqueous inks which are largely composed of organic solvents. Water is also an excellent media for dispersed pigments or dissolved dyes.

The use of water in large concentrations, however, also has several disadvantages. Water has a slow evaporation rate relative to low-boiling organic solvents, which reduces the rate of drying, and thus the rate of printing. Water also interacts with paper to cause two major distortions known as paper cockle and paper curl. Paper cockle is a distortion in which bumps, indentations and other irregularities are randomly produced on the printed paper, giving the paper a "wrinkled" appearance. Curl is a phenomena in which the edges of the paper migrate towards the center of the paper. The direction of curl may be on the printed side of the paper, or it may be on the non-printed side (the latter being known as "reverse curl").

Curl may appear immediately after printing, or may take days to appear. In its final state, the paper sheet may take the form of a tube. Curled paper cannot be stacked, thereby causing much inconvenience to the user. Curled sheets are difficult to display or store and cannot be used in processes requiring near planarity, such as media feeding, tracking, and print alignment. Curl is most prevalent in solid fill printing and is therefore a more acute problem in graphics as opposed to text printing. For the same reason, it is mostly a concern in 4 color printing where graphics are prominent. The use of heating elements (commonly employed to increase the rate of drying of aqueous inks) are known to accelerate paper curl.

Various mechanical devices, such as heated rollers and tension applicators, have been tried to reduce curl. These devices are only marginally effective and add considerably to the cost and size of the printer. (Heated rollers used to reduce curl differ from the heaters used to increase drying rate; in the former heat is applied to both sides of the paper after printing, whereas in the latter heat is applied during the printing process.)

It is also known to reduce curl by modifying the print media. This approach is highly undesirable, however, because it is expensive and because consumers have an overwhelming preference for printers that can use a wide variety of office papers. This is especially the case for printers sold into the electrophotographic copier paper market, or so-called "plain-paper" printers.

There is thus a need for aqueous ink compositions which can be printed in full page graphics without producing paper curl, thereby eliminating the need for expensive, ineffective and cumbersome mechanical devices or special print media.

SUMMARY OF THE INVENTION

The present invention provides a printing process for reducing paper curl without introducing other problems such as pluggage, kogation, inferior print quality, or instability in storage, and at much lower cost than can be obtained by equipment or media modifications. Accordingly, the invention provides a printing process for reducing paper curl in plain-paper printed elements consisting essentially of applying an ink jet composition to a plain-paper substrate, wherein the ink composition is composed of an aqueous carrier medium, a colorant, and at least one anti-curl agent in an amount effective to substantially eliminate curl in a plain paper substrate, wherein the anti-curl agent has a solubility in water of at least 4.5% at 25° C. and is selected from the group consisting of:

(a) a compound having the formula:

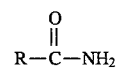

wherein R is a linear or branched aliphatic compound having 1, 2, 4 or 5 carbon atoms;

(b) a compound having the formula:

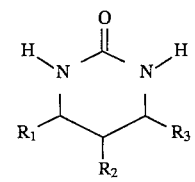

wherein $R_1$, $R_2$ and $R_3$ independently are H, $CH_3$ or $CH_2CH_3$;

(c) a compound having the formula:

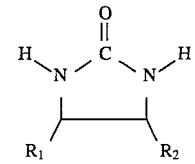

wherein $R_1$ and $R_2$ independently are H, $CH_3$ or $CH_2CH_3$; and (d) a compound having the formula:

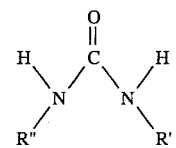

wherein R' and R" independently are H, $CH_3$, $-CH_2CH_3$, $-CH_2CH_2CH_3$, or

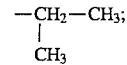

with the proviso that R' and R" together have up to 6 carbon atoms.

DETAILED DESCRIPTION OF THE INVENTION

The aqueous inks of this invention containing the anticurl agent are particularly suited for use in ink jet printers in general, and thermal ink jet printers in particular. These inks are also useful in air brush type applications. The ink compositions may contain either a pigment or dye colorant.

The inks may be adapted to the requirements of a particular ink jet printer to provide a balance of light stability, smear resistance, viscosity, surface tension, optical density, low toxicity, high material compatibility and drying rate using additives known in the art.

AQUEOUS CARRIER MEDIUM

The aqueous carrier medium is water, or a mixture of water and at least one water soluble organic solvent other than the anti-curl agents. Deionized water is commonly used.

Water-soluble organic solvents are well known, with representative examples disclosed in U.S. Pat. No. 5,085,698. Selection of a suitable mixture of water and water soluble organic solvent depends upon requirements of the specific application, such as desired surface tension and viscosity, the selected colorant, drying time of the ink, and the media substrate onto which the ink will be printed. A mixture of a water soluble organic solvent having at least two hydroxyl groups (e.g., diethylene glycol) and deionized water is preferred as the aqueous carrier medium.

If a mixture of water and organic solvent is used as the aqueous carrier medium, water is between 30% and 95%, preferably 60% to 95%, by weight of the aqueous medium, based on the total weight of the aqueous carrier medium including the anti-curl agent.

The amount of aqueous carrier medium (including the anti-curl agent) is in the range of approximately 70 to 99.8%, preferably 84 to 99.8%, based on total weight of the ink when an organic pigment is selected; approximately 25 to 99.8%, preferably 70 to 99.8% when an inorganic pigment is selected; and 80 to 99.8% when a dye is selected.

COLORANTS

The colorant may be a pigment dispersion or a dye. The term "pigment" means a colorant that is applied in an insoluble particulate state. The term "dye" means a colorant that is applied in a soluble state. Disperse dyes which are insoluble colorants, also may be selected.

The term "pigment dispersion", as is known in the art and as used herein, refers to a mixture of a pigment and a dispersing agent. Preferably the dispersing agent is a polymeric dispersant.

Dyes:

Useful dyes include anionic, cationic, amphoteric and non-ionic dyes. Such dyes are well known in the art. Anionic dyes yield colored anions in aqueous solution, and cationic dyes yield colored cations in aqueous solution. Typically anionic dyes contain carboxylic or sulfonic acid groups as the ionic moiety. Cationic dyes usually contain quaternary nitrogen groups.

Amphoteric dyes may be anionic, cationic or have both charges as a function of solution pH. Certain non-ionic dyes have sufficient water solubility to be used in aqueous inks. Dyes with poor solubility are treated as pigments and may be dispersed for use in aqueous inks in the same manner as discussed below.

All types of dyes mentioned above are typically classified by their end use. Some of the more common classes of dyes are Acid, Basic, Direct, Food, Disperse, Mordant, Vat, Solvent and Reactive dyes. Any of these classes of dyes may have one or more distinct functional groups such as nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds, diphenylmethane compounds, acridine compounds, quinoline compounds, methine or polymethine compounds, indamine or indophenyl compounds, among others, all of which are well known in the art.

The color and amount of dye used in the ink is largely a function of choice, being primarily dependent upon the desired color of the print achieved with the ink, the purity of the dye, and its strength. Low concentrations of dye may not provide color vividness. High concentrations may result in poor printhead performance or dark colors. The dye is present in the amount of 0.01 to 20% by weight, preferably 0.05 to 8% by weight, more preferably 0.1 to 5% by weight, based on the total weight of the ink.

Pigments:

Useful pigments for the dispersion include a wide variety of organic and inorganic pigments, alone or in combination. Dyes that are substantially insoluble in the aqueous carrier medium (e.g. disperse dyes) also may be selected.

The pigment particles should be sufficiently small to permit free flow of the ink through the ink jet printing device. Particle size also has an influence on the stability of the pigment dispersion. Brownian motion of minute particles will help prevent the particles from settling. Small particle size is also desirable for maximum color strength. The range of useful particle size is approximately 0.005 micron to 15 microns. Preferably, the pigment particle size should range from 0.005 to 5 micron, and most preferably from 0.01 to 0.5 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be selected are disclosed in the aforementioned U.S. Pat. No. 5,085,698.

Fine particles of metal or metal oxides also may be selected. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

In the case of organic pigments, the ink may contain up to approximately 30% pigment by weight, but will typically be in the range of 0.1 to 15%, preferably 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments.

Dispersants:

Polymeric dispersants are the preferred dispersants for pigments. Suitable polymeric dispersants include AB, BAB or ABC block copolymers. Most preferred are polymeric dispersants made by the group transfer polymerization process because these are free from higher molecular weight species that tend to plug pen nozzles.

Suitable AB or BAB block copolymers, and the synthesis thereof, are disclosed in the aforementioned U.S. Pat. No. 5,085,698. Suitable ABC triblock copolymers, and their synthesis, are disclosed in Ma et al., EPO Publication 0556649 A1, published Aug. 25, 1993, and U.S. Pat. No. 5,219,945.

Although random copolymers can be used as dispersing agents, they are not as effective in stabilizing pigment dispersions as the block polymers, and therefore are not preferred.

The polymeric dispersant is generally present in the range of approximately 0.1 to 30%, preferably 0.1 to 8% by weight of the total ink composition. Dispersion stability of the pigment particles is adversely affected if insufficient polymeric dispersant is present.

In addition to, or in place of the preferred polymeric dispersant compounds, surfactant compounds may be used as dispersants. These may be anionic, cationic, nonionic, or amphoteric surfactants. A detailed list of non-polymeric as well as some polymeric dispersants is provided in the section on dispersants, pages 110–129, 1990 McCutcheon's Functional Materials, North American Edition, Manufacturing Confection Publishing Co., Glen Rock, N.J., 07452.

ANTI-CURL AGENTS

The anti-curl agents used in practicing the present invention have a solubility in water of at least 4.5% (4.5 parts anti-curl agent in 100 parts of water) at 25° C. and are selected from the classes of compounds discussed below.

(a) a compound having the formula:

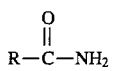

wherein R is a linear or branched aliphatic compound having 1, 2, 4 or 5 carbon atoms. Representative compounds include acetamide, propionamide, isobutyramide and hexanamide. Acetamide and propionamide are preferred.

(b) a compound having the formula:

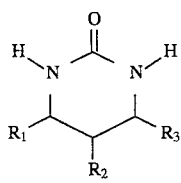

wherein $R_1$, $R_2$ and $R_3$ independently are H, $CH_3$ or $CH_2CH_3$. Representative compounds include tetrahydro-2-pyrimidone, 3-methyl-tetrahydro-2-pyrimidone, 4-methyl-tetrahydro-2-pyrimidone, 3-ethyl-tetrahydro-2-pyrimidone and 4-ethyl-tetrahydro-2-pyrimidone. Tetrahydro-2-pyrimidone is preferred.

(c) a compound having the formula:

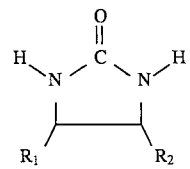

wherein $R_1$ and $R_2$ independently are H, $CH_3$ or $CH_2CH_3$. Representative compounds include 2-imidazolidinone, dimethylimidazolidinone, and diethylimidazolidinone. 2-imidazolidinone is preferred.

(d) a compound having the formula:

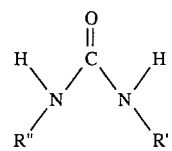

wherein R' and R" independently are H, $CH_3$, $-CH_2CH_3$, $-CH_2CH_2CH_3$, or $$-\underset{\underset{CH_3}{|}}{CH_2}-CH_3;$$

with the proviso that R' and R" together have up to 6 carbon atoms. Representative compounds include butyl urea; 1,3-dimethyl urea; ethyl urea; propyl urea; isopropyl urea; and 1,3-diethyl urea. Preferred compounds include butyl urea and 1,3-dimethyl urea.

Mixtures of compounds, both within and among the classes mentioned also may be selected in practicing the invention.

To be effective, the anti-curl agents must be present in an amount of at least 10% by weight, based on the total weight of the ink composition. Acceptable ranges for the anti-curl agents are 10–75%, preferably 12–55%, and most preferably 15–30%, based on the total weight of ink.

OTHER INGREDIENTS

The ink may contain other ingredients. For example, the surfactants mentioned above may be used to alter surface tension as well as maximize penetration. However, because surfactants may destabilize pigment dispersions, care should be taken to insure compatibility of the surfactant with the other ink components. In aqueous inks, the surfactants may be present in the amount of 0.01–5% and preferably 0.2–3%, based on the total weight of the ink.

Biocides may be used in the ink compositions to inhibit growth of microorganisms. Dowicides® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.) and sodium benzoate are examples of such biocides.

In addition, sequestering agents such as EDTA may be included to eliminate deleterious effects of heavy metal impurities. Other known additives, such as viscosity modifiers and other acrylic or non-acrylic polymers may also be added to improve various properties of the ink compositions. As noted above, many of the anti-curl agents of this invention are effective humectants for many ink jet ink formulations.

INK PREPARATION

The ink compositions of the present invention are prepared in the same manner as other ink jet ink compositions. If a pigment dispersion is used as the colorant, the dispersion is prepared by premixing the selected pigment(s) and dispersant in water. The dispersion step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium, as described in U.S. Pat. No. 5,026,427. Other cosolvents that improve penetration or decap properties may be present during the dispersion step.

If a dye is used as the colorant, there is no dispersant present and no need for pigment deaggregation. The dye-based ink is typically prepared in a well agitated vessel rather than in dispersing equipment.

It is generally desirable to make the ink jet inks in concentrated form, which is subsequently diluted to the appropriate concentration for use in the ink jet printing system. By dilution, the ink is adjusted to the desired viscosity, color, hue, saturation density, and print area coverage for the particular application.

INK PROPERTIES

Jet velocity, separation length of the droplets, drop size, and stream stability are greatly affected by the surface tension and the viscosity of the ink. Ink jet inks suitable for use with ink jet printing systems should have a surface tension in the range of about 18 dyne/cm to about 70 dyne/cm and, more preferably, in the range 20 dyne/cm to about 50 dyne/cm at 20° C. Acceptable viscosities are no greater than 20 cP, and preferably in the range of about 1.0 cP to about 10.0 cP at 20° C. with appropriate rheology for both image setting and thermal ink jet firing refill frequencies.

The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus.

Although particularly advantageous for use in printing plain-paper elements, the inks of this invention are also suitable for use with a variety of print media, such as fabrics, transparencies, etc. The printed ink images have clear color tones and high density. The inks are compatible with the component parts of ink jet printing devices and they are essentially odorless.

EXAMPLES

The invention will now be further illustrated by the following examples, in which parts and percentages are by weight unless otherwise noted. All anticurl agents were purchased from Aldrich unless otherwise indicated.

Polymer Preparation 1:

This shows the preparation of a cationic polymer used to disperse pigment. It is a BZMA//DMAEMA 10//20 diblock polymer.

A 12-liter flask was equipped with a mechanical stirrer, thermometer, N2 inlet, drying tube outlet, and addition funnels. Tetrahydrofuran THF, 4002 gm, and p-xylene, 7.7 gm, were charged to the flask. The catalyst tetrabutyl ammonium m-chlorobenzoate, 2.0 ml of a 1.0M solution in acetonitrile, was then added. Initiator, 1-methoxy-1-trimethylsiloxy-2-methyl propene, 155.1 gm (0.891M) was injected. Feed I [2-dimethylaminoethyl methacrylate DMAEMA, 2801 gm (17.8)] was started at 0.0 minutes and added over 45 minutes. One hundred minutes after Feed I was completed (over 99% of the monomers had reacted) Feed II [benzyl methacrylate, 1568 gm (8.91M)] was started and added over 30 minutes.

At 400 minutes, 310 gm of dry methanol were added to the above solution and distillation begun. A total of 1725 gm of solvent was removed. I-propanol, 1783 gm, was added after completion of the distillation. This made a BZMA//DMAEMA 10//20 diblock polymer at 49.6% solids and a Mn=5000.

Dispersion Preparation 1:

This shows the preparation of a cationic cyan pigment dispersion using a BZMA//DMAEMA 10//20 diblock polymer and a 2 roll mill.

A cyan pigment dispersion was prepared by thoroughly mixing the following ingredients:

| INGREDIENT | AMOUNT (GM) |
|---|---|
| Polymer from Preparation 1 (55.91% solids) | 214.6 |
| Copper phthalocyanine cyan pigment, (B 15:4 Cookson, Inc.) | 180.0 |

This mixture was then charged to a 2 roll mill and processed for 30 minutes. This made a pigment dispersion that contained 60% pigment and 40% polymer. It had a P/D=1.5/1. This 2 roll mill chip was then dissolved using phosphoric acid as the neutralizing agent to make an aqueous pigment concentrate.

An aqueous pigment dispersion concentrate was prepared by mixing the 2 roll mill chip and dissolving it, with adequate stirring, using phosphoric acid as the neutralizing agent:

| INGREDIENT | AMOUNT (GM) |
|---|---|
| Pigment Dispersion 1 | 80.00 |
| Phosphoric acid (86.0%) | 13.14 |
| Deionized water | 307.00 |

Additional water was added to give an aqueous pigment concentrate that contained 11.01% pigment and had 90 mole % of the amine groups from the polymer neutralized with phosphoric acid.

Control 1:

A cyan ink were prepared containing 2.5% pigment using the above described pigment dispersion. The ink had the following composition:

| INGREDIENT | Vehicle (grams) |
|---|---|
| Pigment Dispersion 1 | 4.2 |
| 2-ethyl-2(hydroxymethyl)-1,3-propanediol[1] | 5.0 |
| Silwet ® L7607 surfactant, Union Carbide Corporation, Danbury, CT. | 1.0 |
| Deionized water | 89.8 |

[1]In the amount used this component functions as a humectant.

The inks were filled into empty ink jet pens which were intended for use in the HP XL300 printer, Hewlett Packard Company, Palo Alto, Calif., and tested on that printer. 200% area fill plots were produced on Gilbert® bond paper (25% cotton, style 1057, Mead Company, Dayton, Ohio) and Hammermill Fore® DP (Hammermill Papers, Erie, Pa.). The printed area extended to within 1 inch (2.54 cm) of the edge of the paper. Curl of the papers was monitored by measuring the deflection of the paper's edge in millimeters with a ruler. Curl was measured 1 hour and 24 hours after printing. The following scale was used to rate the observed curl:

| CURL RATING | PAPER DEFLECTION (mm) |
|---|---|
| 1 | = or <10 |
| 2 | 10–25 |
| 3 | 25–40, <90° curl |
| 4 | >40, <90° curl |
| 5 | >90° curl on both sides |
| 6 | tube |

Results are shown in Table 1 below.

EXAMPLE 1

Three additional cyan inks were prepared as described in Control 1 with the following exception: Ink Sample 1 contained 5% by weight Imidazolidinone, Ink Sample 2 contained 5% by weight butyl urea, and Ink Sample 3 contained 5% by weight 1,3-dimethyl urea in addition to the above identified vehicle components.

The inks were tested for curl as described in Control 1 with the following results.

TABLE 1

| CONTROL/ EXAMPLE # | ANTI-CURL AGENT | CURL RATING ON GILBERT® BOND PAPER 1 HR | CURL RATING ON GILBERT® BOND PAPER 24 HRS | CURL RATING ON HAMMERMILL FORE® DP PAPER 1 HR | CURL RATING ON HAMMERMILL FORE® DP PAPER 24 HRS |
|---|---|---|---|---|---|
| CONTROL 1 | none | 6 | 6 | 6 | 6 |
| EX 1, SAMPLE 1 | Imidazolidinone | 1 | 1 | 2 | 1 |
| EX 1, SAMPLE 2 | Butyl urea | 2 | 1 | 3 | 3 |
| EX 1, SAMPLE 3 | 1,3 Dimethyl Urea | 1 | 1 | 1 | 2 |

These ink formulations were also tested for general printing performance and were found to give good performance.

What is claimed is:

1. A process for reducing paper curl in plain-paper printed elements, consisting essentially of applying an ink jet composition to a plain-paper substrate, wherein the ink composition comprises an aqueous carrier medium, a colorant, and at least one anti-curl agent in an amount effective to substantially eliminate curl in said plain paper substrate, wherein the anti-curl agent has a solubility in water of at least 4.5% at 25° C. and is selected from the group consisting of:

(a) a compound having the formula:

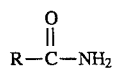

wherein R is a linear or branched aliphatic compound having 1, 2, 4 or 5 carbon atoms;

(b) a compound having the formula:

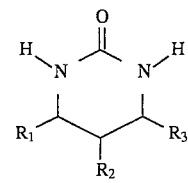

wherein $R_1$, $R_2$ and $R_3$ are independently H, $CH_3$ or $CH_2CH_3$;

(c) a compound having the formula:

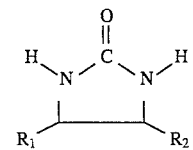

wherein $R_1$ and $R_2$ are independently H, $CH_3$ or $CH_2CH_3$; and (d) a compound having the formula:

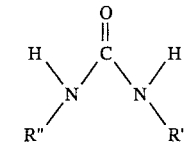

wherein R' and R" independently are H, $CH_3$, —$CH_2CH_3$, —$CH_2CH_2CH_3$, or

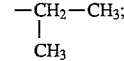

with the proviso that R' and R" together have up to 6 carbon atoms.

2. The process of claim 1 wherein the colorant is a pigment dispersion comprising a pigment and a polymeric dispersant.

3. The process of claim 1 wherein the colorant is a dye.

4. The process of claim 1 wherein the anti-curl agent is a compound having structure (a).

5. The process of claim 4 wherein the anti-curl agent is selected from the group consisting of acetamide, propionamide, isobutyramide and hexanamide.

6. The process of claim 1 wherein the anti-curl agent is a compound having structure (b).

7. The process of claim 6 wherein the anti-curl agent is selected from the group consisting of tetrahydro-2-pyrimidone; 3-methyl-tetrahydro-2-pyrimidone; 4-methyl-tetrahydro-2-pyrimidone; 3-ethyl-tetrahydro-2-pyrimidone; and 4-ethyl-tetrahydro-2-pyrimidone.

8. The process of claim 1 wherein the anti-curl agent is a compound having structure (c).

9. The process of claim 8, wherein the anti-curl agent is selected from the group consisting of 2-imidazolidinone; dimethylimidazolidinone; and diethylimidazolidinone.

10. The process of claim 1 wherein the anti-curl agent is a compound having structure (d).

11. The process of claim 10 wherein the anti-curl agent is selected from the group consisting of butyl urea; 1,3-dimethyl urea; ethyl urea; propyl urea; isopropyl urea; 1,3-diethyl urea.

12. The process of claim 3 wherein said polymeric dispersant is a block copolymer and wherein the ink composition comprises approximately 0.1 to 8% pigment, 0.1 to 8% block copolymer, and 84 to 99.8% aqueous carrier medium and anti-curl agent, based upon the total weight of the ink composition.

13. The process of claim 4 comprising approximately 0.01 to 20% dye, and 80 to 99.99% aqueous carrier medium and anti-curl agent, based on the total weight of the ink composition.

14. The process of claim 4 further containing a polymer selected from the group consisting of AB block polymers, BAB block polymers, ABC block polymers and random polymers.

15. The process of claim 1 wherein the anti-curl agent is present in the amount of 10 to 75% by weight, based on the total weight of ink.

16. The process of claim 1 wherein said ink composition is an ink jet ink having a surface tension of approximately 18 to 70 dyne/cm and a viscosity of no greater than 20 cP at 20° C.

17. The process of claim 1 further containing a surfactant.

18. An aqueous ink particularly adapted for printing a plain paper substrate in an ink jet printer, said ink comprising an aqueous carrier medium, a colorant, and an effective amount of at least one anticurl agent to substantially eliminate curl in the paper substrate; wherein said anti-curl agent comprises 10 to 75% of said ink by weight, has a solubility in water of at least 4.5% at 25° C., and is selected from the group consisting of:

(a) a compound having the formula:

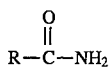

wherein R is a linear or branched aliphatic compound having 1, 2, 4 or 5 carbon atoms;

(b) a compound having the formula:

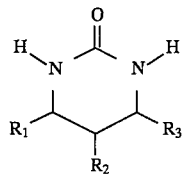

wherein $R_1$ $R_2$ and $R_3$ are independently H, $CH_3$ or $CH_2CH_3$;

(c) a compound having the formula:

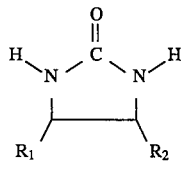

wherein $R_1$ and $R_2$ are independently H, $CH_3$ or $CH_2CH_3$; and (d) a compound having the formula:

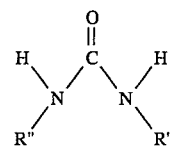

wherein R' and R" independently are H, $CH_3$, $-CH_2CH_3$, $-CH_2CH_2CH_3$, or

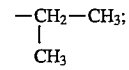

with the proviso that R' and R" together have up to 6 carbon atoms.

19. The ink of claim 18 wherein the colorant is a pigment dispersion comprising a pigment and a polymeric dispersant.

20. The ink of claim 19 wherein said anti-curl agent comprises 12 to 55% of said ink by weight.

21. The ink of claim 18 wherein the colorant is a dye.

22. The ink of claim 21 wherein said anti-curl agent comprises 12 to 55% of said ink by weight.

23. The ink of claim 18 wherein the anti-curl agent is a compound having structure (a).

24. The ink of claim 23 wherein the anti-curl agent is selected from the group consisting of acetamide, propionamide, isobutyramide and hexanamide.

25. The ink of claim 18 wherein the anti-curl agent is a compound having structure (b).

26. The ink of claim 25 wherein the anti-curl agent is selected from the group consisting of tetrahydro-2-pyrimidone; 3-methyl-tetrahydro-2-pyrimidone; 4-methyl-tetrahydro-2-pyrimidone; 3-ethyl-tetrahydro-2-pyrimidone; and 4-ethyl-tetrahydro-2-pyrimidone.

27. The ink of claim 18 wherein the anti-curl agent is a compound having structure (c).

28. The ink of claim 27, wherein the anti-curl agent is selected from the group consisting of 2-imidazolidinone; dimethylimidazolidinone; and diethylimidazolidinone.

29. The ink of claim 18 wherein the anti-curl agent is a compound having structure (d).

30. The ink of claim 29 wherein the anti-curl agent is selected from the group consisting of butyl urea; 1,3-dimethyl urea; ethyl urea; propyl urea; isopropyl urea; 1,3-diethyl urea.

31. The ink of claim 18 wherein said ink contains 0.1 to 8% pigment colorant, 0.1 to 8% polymeric dispersant, and 12 to 55% anti-curl agent, by weight.

32. The ink of claim 31 wherein said polymeric dispersant is selected from the group consisting of AB block polymers, BAB block polymers, ABC block polymers, and random polymers.

33. The ink of claim 32 wherein said ink contains a block polymer and 15 to 30% by weight of at least one anti-curl agent.

34. The ink of claim 18 wherein said ink contains a dye colorant and 15 to 30% by weight of at least one anti-curl agent.

* * * * *